(12) United States Patent
Sugiyama

(10) Patent No.: US 11,590,450 B2
(45) Date of Patent: Feb. 28, 2023

(54) $CO_2$ SEPARATION SYSTEM

(71) Applicant: TOYOTA JIDOSHA KABUSHIKI KAISHA, Toyota (JP)

(72) Inventor: Kouseki Sugiyama, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 17/185,082

(22) Filed: Feb. 25, 2021

(65) Prior Publication Data

US 2021/0291109 A1 Sep. 23, 2021

(30) Foreign Application Priority Data

Mar. 23, 2020 (JP) .............................. JP2020-051589

(51) Int. Cl.
*B01D 53/22* (2006.01)
*B01D 53/26* (2006.01)
(Continued)

(52) U.S. Cl.
CPC ......... *B01D 53/229* (2013.01); *B01D 53/265* (2013.01); *B01D 53/94* (2013.01);
(Continued)

(58) Field of Classification Search
CPC .... B01D 53/229; B01D 53/265; B01D 53/94; B01D 53/22; B01D 53/86;
(Continued)

(56) References Cited

U.S. PATENT DOCUMENTS

2008/0011161 A1* 1/2008 Finkenrath ............. B01D 53/22
96/4
2011/0260112 A1* 10/2011 Wijmans ................ F23J 15/006
252/372
(Continued)

FOREIGN PATENT DOCUMENTS

CN 202501587 U 10/2012
CN 103648618 A 3/2014
(Continued)

*Primary Examiner* — Devon C Kramer
*Assistant Examiner* — Kelsey L Stanek
(74) *Attorney, Agent, or Firm* — Finnegan, Henderson, Farabow, Garrett & Dunner, LLP

(57) ABSTRACT

A $CO_2$ separation system configured to separate $CO_2$ from mixed gas containing $CO_2$ includes a $CO_2$ separator, a $CO_2$ collector, and a pressure difference generator. The $CO_2$ separator includes a separation membrane configured to separate the $CO_2$ from the mixed gas, and a separation-membrane upstream chamber and a separation-membrane downstream chamber demarcated by the separation membrane. The $CO_2$ separator is disposed to cause the mixed gas to flow into the separation-membrane upstream chamber. The pressure difference generator includes at least a negative pressure generator. The negative pressure generator is disposed on a gas path of the permeating gas that connects the separation-membrane downstream chamber and the $CO_2$ collector.

6 Claims, 6 Drawing Sheets

(51) Int. Cl.
*B01D 53/94* (2006.01)
*F28D 15/04* (2006.01)

(52) U.S. Cl.
CPC ........ *F28D 15/04* (2013.01); *B01D 2257/504* (2013.01); *B01D 2258/01* (2013.01)

(58) Field of Classification Search
CPC .......... B01D 2257/504; B01D 2258/01; B01D 2259/4566; F28D 15/04; F23J 15/02; F23J 15/50
USPC .......................................................... 60/272
See application file for complete search history.

(56) References Cited

U.S. PATENT DOCUMENTS

| | | | |
|---|---|---|---|
| 2013/0333638 A1* | 12/2013 | Nishida .................. | F02M 23/00 123/3 |
| 2019/0388830 A1 | 12/2019 | Sugiyama | |
| 2021/0093992 A1* | 4/2021 | Sugiyama .............. | B60K 35/00 |

FOREIGN PATENT DOCUMENTS

| | | | | |
|---|---|---|---|---|
| DE | 102011004792 A1 * | 9/2011 | ............... | F01N 3/04 |
| JP | 2014-508240 A | 4/2014 | | |
| JP | 5534099 B2 | 6/2014 | | |
| JP | 6267375 B2 | 1/2018 | | |
| JP | 6359544 B2 | 7/2018 | | |
| JP | 2019-217465 A | 12/2019 | | |
| KR | 10-1606621 B1 | 3/2016 | | |
| KR | 10-1861646 B1 | 5/2018 | | |
| WO | WO2012/100182 A1 | 7/2012 | | |
| WO | WO2014/062422 A1 | 4/2014 | | |

* cited by examiner

$CO_2$ SEPARATION SYSTEM

CROSS-REFERENCE TO RELATED APPLICATION

This application claims priority to Japanese Patent Application No. 2020-051589 filed on Mar. 23, 2020, incorporated herein by reference in its entirety.

BACKGROUND

1. Technical Field

The present disclosure relates to a $CO_2$ separation system.

2. Description of Related Art

Japanese Patent No. 6359544 (JP 6359544 B) discloses a carbon dioxide ($CO_2$) separation system configured such that $CO_2$ in exhaust gas discharged from an internal combustion engine is selectively separated by using a facilitated transport membrane and the separated $CO_2$ is condensed and stored.

SUMMARY

However, JP 6359544 B does not explicitly disclose how the separated $CO_2$ is collected eventually. Thus, there is a possibility that the separated $CO_2$ cannot be collected efficiently.

The present disclosure provides a $CO_2$ separation system that can efficiently collect $CO_2$ separated from mixed gas containing $CO_2$.

A $CO_2$ separation system according to one aspect of the present disclosure is configured to separate $CO_2$ from mixed gas containing the $CO_2$. The $CO_2$ separation system includes a $CO_2$ separator, a $CO_2$ collector, and a pressure difference generator. The $CO_2$ separator includes a separation membrane configured to separate the $CO_2$ from the mixed gas, and a separation-membrane upstream chamber and a separation-membrane downstream chamber demarcated by the separation membrane. The $CO_2$ separator is disposed to cause the mixed gas to flow into the separation-membrane upstream chamber. The $CO_2$ collector is configured such that permeating gas that contains the $CO_2$ is introduced into the $CO_2$ collector. The $CO_2$ collector is configured to collect the $CO_2$ in the permeating gas. The permeating gas is gas that has permeated the separation membrane and flowed out of the separation-membrane downstream chamber. The pressure difference generator configured to generate a pressure difference between the separation-membrane upstream chamber and the separation-membrane downstream chamber such that a pressure in the separation-membrane upstream chamber is higher than a pressure in the separation-membrane downstream chamber. The pressure difference generator includes at least a negative pressure generator. The negative pressure generator is disposed on a gas path of the permeating gas that connects the separation-membrane downstream chamber and the $CO_2$ collector.

In the $CO_2$ separation system according to the one aspect of the present disclosure, a $CO_2$ partial pressure difference between the separation-membrane upstream chamber and the separation-membrane downstream chamber, which serves as a permeation propulsion force when $CO_2$ permeates the separation membrane, is secured by the simple structure in which the negative pressure generator is provided on the gas path of the permeating gas. Therefore, the permeation of $CO_2$ can be promoted, and the permeating gas discharged from the negative pressure generator to have a pressure corresponding to an atmospheric pressure and have a high $CO_2$ concentration (that is, the permeating gas having a high $CO_2$ partial pressure) can be introduced into the $CO_2$ collector. Thus, the $CO_2$ collection amount of the $CO_2$ collector can be increased. Further, the pressure in the $CO_2$ collector is not a negative pressure. Therefore, it is possible to suppress leakage of $CO_2$ in the $CO_2$ collector to the outside via, for example, the gas path of the permeating gas. Thus, the $CO_2$ collector can efficiently collect $CO_2$ separated from exhaust gas (mixed gas) containing $CO_2$.

The $CO_2$ separation system according to the one aspect of the present disclosure may further include a dehumidifier configured to dehumidify the permeating gas. The dehumidifier and the negative pressure generator may be disposed on the gas path of the permeating gas in order of the dehumidifier and the negative pressure generator from an upstream side in a flow direction of the permeating gas. The $CO_2$ separation system according to the one aspect of the present disclosure may further include a catalyst device. The mixed gas may be exhaust gas discharged from an internal combustion engine mounted on a moving object or from a stationary internal combustion engine. The catalyst device may be disposed on an exhaust path of the internal combustion engine, and may be configured to remove a toxic substance in the exhaust gas. The $CO_2$ separator may be disposed on the exhaust path on a downstream side of the catalyst device in a flow direction of the exhaust gas. The $CO_2$ collector may be configured such that the permeating gas that contains the $CO_2$ and water vapor is introduced into the $CO_2$ collector. The permeating gas is gas that has permeated the separation membrane and flowed out of the separation-membrane downstream chamber. The dehumidifier and the negative pressure generator may be disposed on the gas path of the permeating gas that connects the separation-membrane downstream chamber and the $CO_2$ collector, in order of the dehumidifier and the negative pressure generator from an upstream side in a flow direction of the permeating gas.

The $CO_2$ separation system according to the one aspect of the present disclosure may further include an exhaust gas switching valve provided on the exhaust path between the catalyst device and the separation-membrane upstream chamber, and configured to switch whether to introduce the exhaust gas flowing out of the catalyst device into the separation-membrane upstream chamber or to discharge the exhaust gas flowing out of the catalyst device to outside air without introducing the exhaust gas into the separation-membrane upstream chamber. The $CO_2$ separation system according to the one aspect of the present disclosure may further include a heater. The dehumidifier may be configured to dehumidify the permeating gas by cooling the permeating gas through heat exchange with a heating medium and condensing moisture in the permeating gas. The heater may be configured to heat the $CO_2$ collector by using heat of the heating medium that is received through the heat exchange with the permeating gas.

In the $CO_2$ separation system according to the one aspect of the present disclosure, the heater may include a heat accumulator configured to accumulate the heat of the heating medium that is received through the heat exchange with the permeating gas, and a heat transfer unit configured to transfer the heat in the heat accumulator to the $CO_2$ collector to heat the $CO_2$ collector. In the $CO_2$ separation system according to the one aspect of the present disclosure, the mixed gas may be exhaust gas discharged from an internal combustion engine mounted on a moving object or from a stationary internal combustion engine. In the $CO_2$ separation system according to the one aspect of the present disclosure, the mixed gas may be air.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
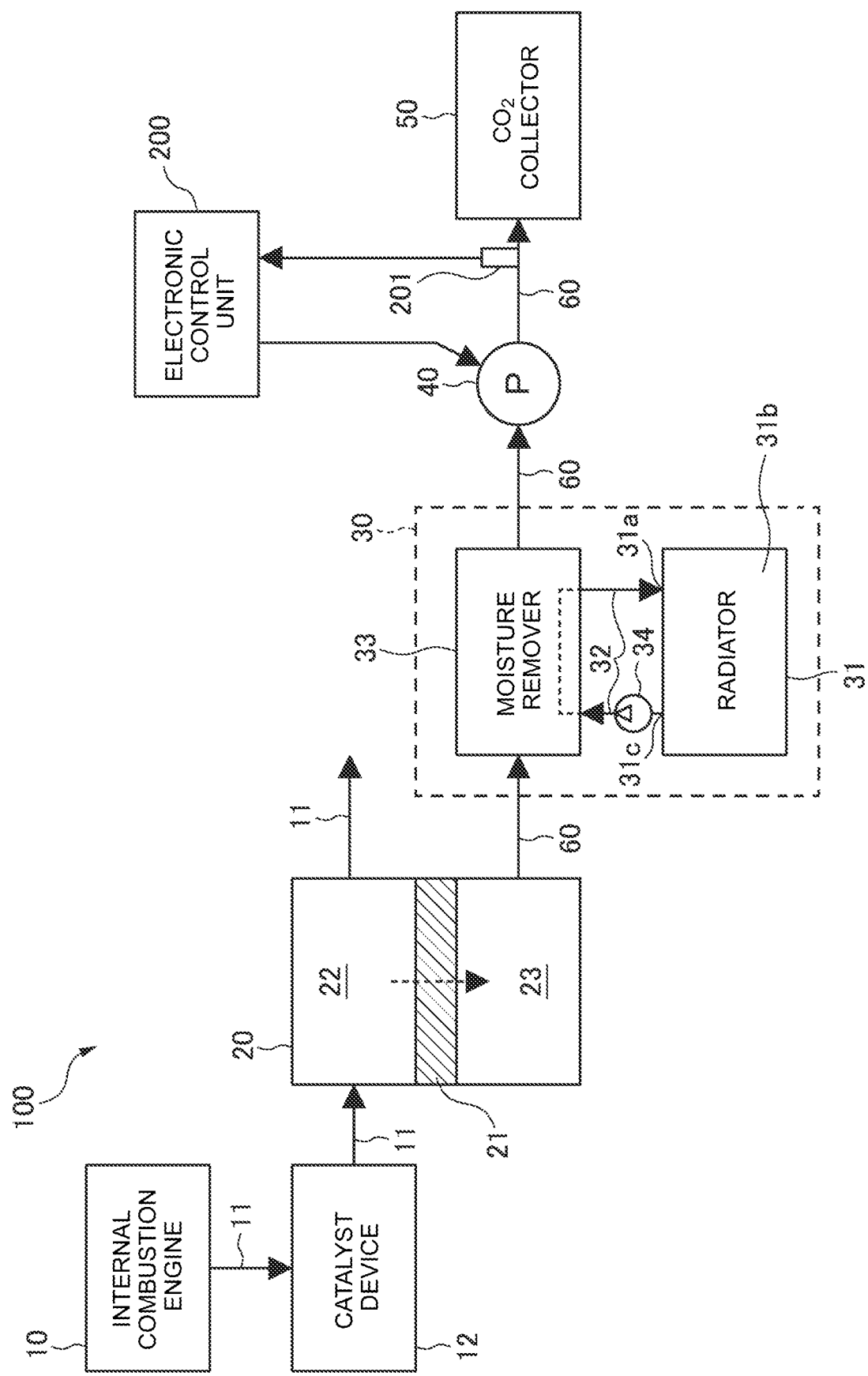
FIG. 1 is a schematic structural diagram of a $CO_2$ separation system according to a first embodiment of the present disclosure.

Referring to the drawings, detailed description is given of carbon dioxide ($CO_2$) separation systems according to embodiments of the present disclosure, which are configured to separate $CO_2$ from the atmosphere (air) or exhaust gas discharged from an internal combustion engine mounted on a moving object such as a vehicle or a ship, or a stationary internal combustion engine provided in a plant or the like. In the following description, the same components are represented by the same reference symbols.

First Embodiment

FIG. 1 is a schematic structural diagram of a $CO_2$ separation system 100 according to a first embodiment of the present disclosure.

The $CO_2$ separation system 100 according to this embodiment includes an internal combustion engine 10, a $CO_2$ separator 20, a dehumidifier 30, a pressure difference generator 40, a $CO_2$ collector 50, and an electronic control unit 200. The $CO_2$ separation system 100 separates $CO_2$ in exhaust gas discharged from the internal combustion engine 10.

The internal combustion engine 10 generates power for driving, for example, a vehicle by burning fuel in a combustion chamber formed in the internal combustion engine 10. The internal combustion engine 10 has an exhaust passage 11 through which exhaust gas generated in the combustion chamber (burned gas) is discharged into the atmosphere. The exhaust passage 11 is provided with a catalyst device 12 configured to remove toxic substances in the exhaust gas.

The $CO_2$ separator 20 includes a separation membrane 21, a separation-membrane upstream chamber 22, and a separation-membrane downstream chamber 23. The separation-membrane upstream chamber 22 and the separation-membrane downstream chamber 23 are demarcated by the separation membrane 21. The $CO_2$ separator 20 is provided in the exhaust passage 11 on a downstream side of the catalyst device 12 in an exhaust gas flow direction to cause exhaust gas to flow into the separation-membrane upstream chamber 22.

The separation membrane 21 has a function of separating $CO_2$ from exhaust gas by causing $CO_2$ in the exhaust gas to permeate the separation membrane 21. The separation membrane 21 also has a function of separating, when exhaust gas contains water vapor, $CO_2$ together with water vapor from the exhaust gas by causing $CO_2$ and water vapor to permeate the separation membrane 21. Examples of the separation membrane 21 include a facilitated transport membrane, an organic polymer membrane, an inorganic material membrane, and a liquid membrane. The $CO_2$ and water vapor in the exhaust gas that flow into the separation-membrane upstream chamber 22 permeate the separation membrane 21 and flow into the separation-membrane downstream chamber 23 by using, as a permeation propulsion force, a pressure difference (partial pressure difference) between the separation-membrane upstream chamber 22 and the separation-membrane downstream chamber 23 demarcated by the separation membrane 21. The $CO_2$ and water vapor that permeate the separation membrane 21 and flow into the separation-membrane downstream chamber 23 are hereinafter referred to as "permeating gas" as necessary.

The exhaust gas that flows into the separation-membrane upstream chamber 22 and has a $CO_2$ concentration reduced by separating $CO_2$ through the separation membrane 21 is discharged into the exhaust passage 11 on a downstream side of the separation-membrane upstream chamber 22 in the exhaust gas flow direction, and is eventually discharged to outside air. The permeating gas that flows into the separation-membrane upstream chamber 22, permeates the separation membrane 21, and flows into the separation-membrane downstream chamber 23 to have a high $CO_2$ concentration is discharged into a permeating gas passage 60 having one end coupled to the separation-membrane downstream chamber 23 and the other end coupled to the $CO_2$ collector 50.

The dehumidifier 30 removes moisture in gas. The dehumidifier 30 according to this embodiment includes a radiator 31, a coolant circulation passage 32, a moisture remover 33, and a circulation pump 34. The moisture remover 33 is provided in the permeating gas passage 60 so that moisture in the permeating gas can be removed at the moisture remover 33.

The radiator 31 has a coolant inlet 31a, a core 31b, and a coolant outlet 31c. A high-temperature coolant introduced into the radiator 31 through the coolant inlet 31a is cooled by exchanging heat with low-temperature gas such as air in the core 31b and is discharged through the coolant outlet 31c.

The coolant circulation passage 32 is a passage through which the coolant discharged from the coolant outlet 31c of the radiator 31 is supplied to the moisture remover 33 to cool the permeating gas and then returned to the coolant inlet 31a of the radiator 31, thereby circulating the coolant.

The moisture remover 33 is provided in the permeating gas passage 60, and is configured to remove moisture in the permeating gas such that heat is exchanged between relatively high-temperature permeating gas flowing into the moisture remover 33 and a relatively low-temperature coolant supplied to the moisture remover 33 through the coolant circulation passage 32 to cool the permeating gas and condensed water produced by cooling the permeating gas is drained to the outside.

The circulation pump 34 is provided in the coolant circulation passage 32. The circulation pump 34 circulates the coolant in the coolant circulation passage 32 by being driven when dehumidifying (cooling) the permeating gas at the moisture remover 33.

In this embodiment, the permeating gas that permeates the separation membrane 21 is dehumidified instead of dehumidifying the exhaust gas before $CO_2$ and water vapor are separated by the separation membrane 21. The reason is as follows.

In general, the separation membrane 21 has such a characteristic that the membrane permeation rate of water vapor is higher than the membrane permeation rate of $CO_2$. When the exhaust gas contains water vapor, $CO_2$ in the separation-membrane downstream chamber 23 is diluted by the water vapor having the higher membrane permeation rate, and the mole fraction of $CO_2$ decreases. As a result, a $CO_2$ partial pressure difference between the separation-membrane upstream chamber 22 and the separation-membrane downstream chamber 23, which serves as the permeation propulsion force of $CO_2$, increases to promote permeation of $CO_2$. Thus, the separation of $CO_2$ in the $CO_2$ separator 20 can be promoted. That is, the separation of $CO_2$ in the $CO_2$ separator 20 can be promoted when the exhaust gas containing water vapor is introduced into the separation-membrane upstream chamber 22. For the reason described above, the permeating gas that permeates the separation membrane 21 is dehumidified in this embodiment instead of dehumidifying the exhaust gas before $CO_2$ and water vapor are separated by the separation membrane 21.

In this embodiment, the dehumidifier 30 removes moisture in the permeating gas by draining condensed water produced by cooling the permeating gas. The structure of the dehumidifier 30 is not limited to this structure. For example, the dehumidifier 30 may remove moisture in the permeating gas by adsorbing the moisture in the permeating gas on a desiccant having a good water absorbing property.

The pressure difference generator 40 generates a pressure difference between the separation-membrane upstream chamber 22 and the separation-membrane downstream chamber 23 such that a pressure in the separation-membrane upstream chamber 22 is higher than a pressure in the separation-membrane downstream chamber 23. In this embodiment, at least a depressurization pump is used as the pressure difference generator 40. The depressurization pump is provided in the permeating gas passage 60 on a downstream side of the moisture remover 33 in the gas flow direction to reduce the pressure in the separation-membrane downstream chamber 23 to a pressure lower than an atmospheric pressure (negative pressure). In this manner, the pressure difference is generated between the separation-membrane upstream chamber 22 and the separation-membrane downstream chamber 23 such that the pressure in the separation-membrane upstream chamber 22 atmospheric pressure) is higher than the pressure in the separation-membrane downstream chamber 23 (=negative pressure).

By providing the depressurization pump serving as the pressure difference generator 40 in the permeating gas passage 60 on the downstream side of the dehumidifier 30 in the gas flow direction, gas to be sucked into the depressurization pump is dehumidified by the dehumidifier 30. Therefore, it is possible to suppress a breakdown or deterioration of the depressurization pump due to water vapor (moisture) in the sucked gas.

As described above, the other end of the permeating gas passage 60 is coupled to the $CO_2$ collector 50. Permeating gas dehumidified by the dehumidifier 30 and discharged from the depressurization pump to have a pressure corresponding to the atmospheric pressure is introduced into the $CO_2$ collector 50. The $CO_2$ collector 50 includes a solid adsorbent such as zeolite or activated carbon, and collects $CO_2$ in the permeating gas introduced into the $CO_2$ collector 50 via the permeating gas passage 60 by adsorbing $CO_2$ on the solid adsorbent.

In this embodiment, a $CO_2$ sensor 201 is provided in the permeating gas passage 60 between the pressure difference generator 40 and the $CO_2$ collector 50 to estimate an adsorption amount of $CO_2$ adsorbed on the solid adsorbent of the $CO_2$ collector 50. The $CO_2$ sensor 201 detects a flow rate of the permeating gas to be introduced into the $CO_2$ collector 50, and a $CO_2$ concentration in the permeating gas.

The permeating gas having a $CO_2$ concentration reduced by adsorbing $CO_2$ on the solid adsorbent is discharged to outside air from the $CO_2$ collector 50. The $CO_2$ collected by the $CO_2$ collector 50, that is, the $CO_2$ adsorbed on the solid adsorbent can be ejected to the outside through a $CO_2$ ejection port (not illustrated) formed at an arbitrary position on the $CO_2$ collector 50 by heating the $CO_2$ collector 50 and furthermore the solid adsorbent to desorb, from the solid adsorbent, the $CO_2$ adsorbed on the solid adsorbent.

When the permeating gas contains water vapor, the adsorbability of the solid adsorbent such as zeolite tends to decrease. In this embodiment, the decrease in the adsorbability of the solid adsorbent can be suppressed by introducing the dehumidified permeating gas into the $CO_2$ collector 50.

Figure 2:
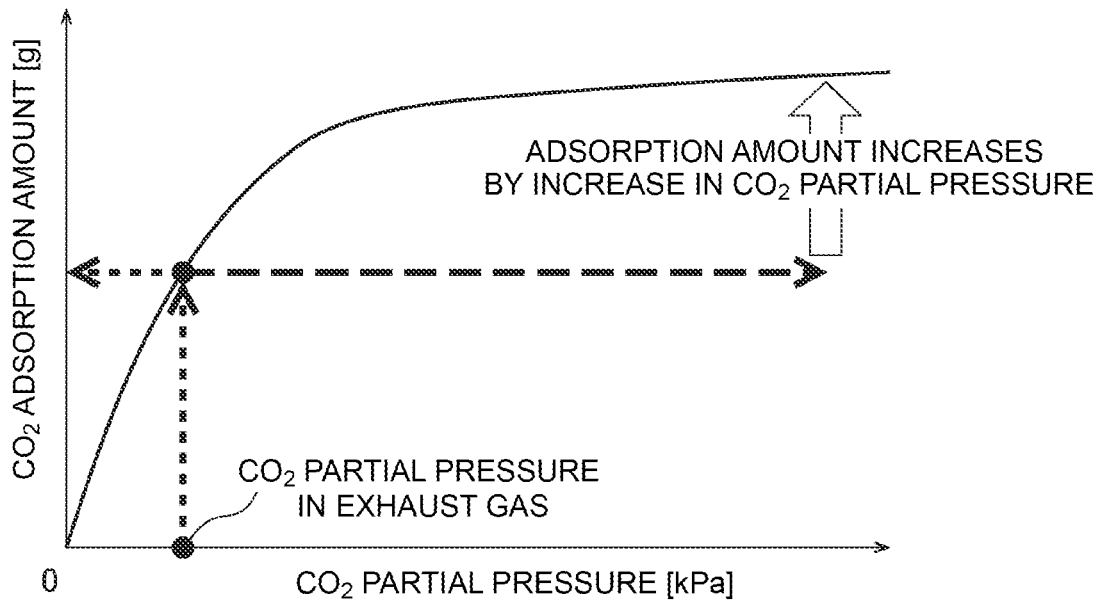
FIG. 2 is a diagram illustrating a relationship between a $CO_2$ partial pressure in permeating gas and a $CO_2$ adsorption amount of a solid adsorbent per unit mass.

FIG. 2 is a diagram illustrating a relationship between a $CO_2$ partial pressure in gas and a $CO_2$ adsorption amount of a solid adsorbent per unit mass. As illustrated in FIG. 2, the $CO_2$ adsorption amount of the solid adsorbent per unit mass tends to increase as the $CO_2$ partial pressure in the gas increases. That is, the $CO_2$ adsorption amount of the solid adsorbent per unit mass can be increased as a $CO_2$ partial pressure in the permeating gas is increased compared to a $CO_2$ partial pressure in the exhaust gas.

In this embodiment, the dehumidifier 30 and the pressure difference generator 40 are arranged in the permeating gas passage 60 in this order from an upstream side in the gas flow direction. Therefore, permeating gas dehumidified by the dehumidifier 30 and discharged from the depressurization pump serving as the pressure difference generator 40 to have a pressure corresponding to the atmospheric pressure and have a high $CO_2$ concentration (that is, permeating gas having a high $CO_2$ partial pressure) can be introduced into the $CO_2$ collector 50. Thus, the $CO_2$ adsorption amount of the $CO_2$ collector 50 can be increased.

Referring back to FIG. 1, the electronic control unit 200 is a microcomputer including a central processing unit (CPU), a read-only memory (ROM), a random-access memory (RAM), an input port, and an output port, which are connected together via a bidirectional bus. The electronic control unit 200 is configured to perform $CO_2$ separation control for separating $CO_2$ in exhaust gas and collecting the $CO_2$ into the $CO_2$ collector 50 during operation of the internal combustion engine 10. Therefore, signals are input to the electronic control unit 200 from various sensors such as the $CO_2$ sensor 201 necessary in the $CO_2$ separation control.

Figure 3:
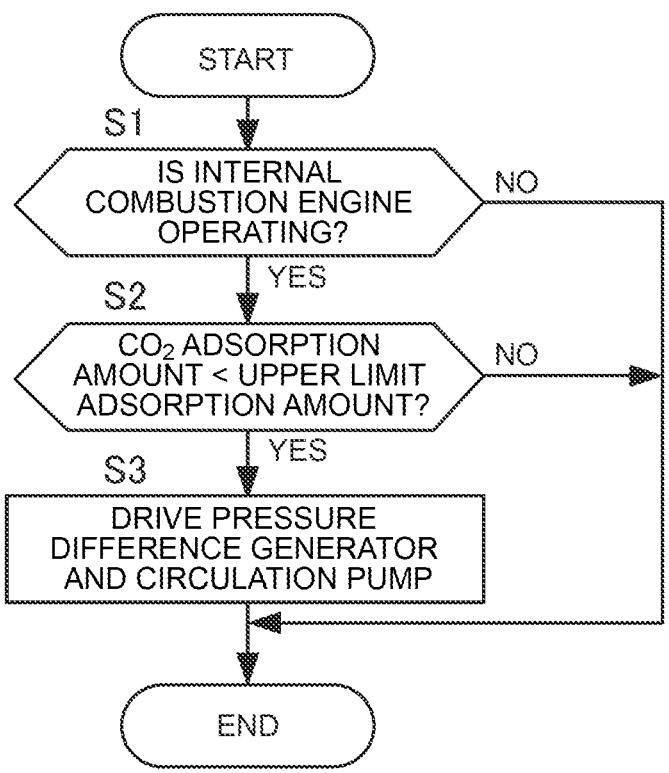
FIG. 3 is a flowchart for describing $CO_2$ separation control according to the first embodiment of the present disclosure.

FIG. 3 is a flowchart for describing the $CO_2$ separation control according to this embodiment to be performed by the electronic control unit 200.

In Step S1, the electronic control unit 200 determines whether the internal combustion engine 10 is operating, that is, whether exhaust gas is discharged from the internal combustion engine 10 to the exhaust passage 11. When the internal combustion engine 10 is operating, the electronic control unit 200 proceeds to a process of Step S2. When the internal combustion engine 10 is not operating, the electronic control unit 200 terminates this process.

In Step S2, the electronic control unit 200 determines whether the adsorption amount of $CO_2$ adsorbed on the solid adsorbent of the $CO_2$ collector 50 is smaller than a predetermined upper limit adsorption amount. When a $CO_2$ adsorption amount estimated based on a detection value from the $CO_2$ sensor 201 is smaller than the upper limit adsorption amount, the electronic control unit 200 proceeds to a process of Step S3. When the $CO_2$ adsorption amount is equal to or larger than the upper limit adsorption amount, the electronic control unit 200 terminates this process because the $CO_2$ collector 50 cannot collect $CO_2$ over the upper limit adsorption amount.

In Step S3, the electronic control unit 200 drives the pressure difference generator 40 to generate a pressure difference between the separation-membrane upstream chamber 22 and the separation-membrane downstream chamber 23 such that the pressure in the separation-membrane upstream chamber 22 is higher than the pressure in the separation-membrane downstream chamber 23. That is, a $CO_2$ partial pressure difference serving as the permeation propulsion force when $CO_2$ permeates the separation membrane 21 is generated between the separation-membrane upstream chamber 22 and the separation-membrane downstream chamber 23. The electronic control unit 200 also drives the circulation pump 34 to dehumidify permeating gas at the moisture remover 33.

According to this embodiment, the $CO_2$ separation system 100 configured to separate $CO_2$ from exhaust gas (mixed gas) containing $CO_2$ includes the $CO_2$ separator 20, the pressure difference generator 40, and the $CO_2$ collector 50. The $CO_2$ separator 20 includes the separation membrane 21 having the function of separating $CO_2$ from the exhaust gas, and the separation-membrane upstream chamber 22 and the separation-membrane downstream chamber 23 demarcated by the separation membrane 21. The $CO_2$ separator 20 is arranged to cause the exhaust gas to flow into the separation-membrane upstream chamber 22. The pressure difference generator 40 generates a pressure difference between the separation-membrane upstream chamber 22 and the separation-membrane downstream chamber 23 such that the pressure in the separation-membrane upstream chamber 22 is higher than the pressure in the separation-membrane downstream chamber 23. Permeating gas that contains $CO_2$ is introduced into the $CO_2$ collector 50. The $CO_2$ collector 50 collects the $CO_2$ in the permeating gas. The permeating gas is gas that has permeated the separation membrane 21 and flowed out of the separation-membrane downstream chamber 23. The pressure difference generator 40 includes at least the depressurization pump that is an example of a negative pressure generator. The depressurization pump is arranged in the permeating gas passage 60 connecting the separation-membrane downstream chamber 23 and the $CO_2$ collector 50 (on a gas path of the permeating gas).

Accordingly, the $CO_2$ partial pressure difference between the separation-membrane upstream chamber 22 and the separation-membrane downstream chamber 23, which serves as the permeation propulsion force when $CO_2$ permeates the separation membrane 21, is secured by the simple structure in which the depressurization pump is provided in the permeating gas passage 60. Therefore, the permeation of $CO_2$ can be promoted, and the permeating gas discharged from the depressurization pump to have a pressure corresponding to the atmospheric pressure and have a high $CO_2$ concentration (that is, the permeating gas having a high $CO_2$ partial pressure) can be introduced into the $CO_2$ collector 50. Thus, the $CO_2$ adsorption amount of the $CO_2$ collector can be increased. Further, the pressure in the $CO_2$ collector 50 is not a negative pressure. Therefore, it is possible to suppress leakage of $CO_2$ in the $CO_2$ collector 50 to the outside via the permeating gas passage 60 or the like. Thus, the $CO_2$ collector 50 can efficiently collect $CO_2$ separated from the exhaust gas (mixed gas) containing $CO_2$.

The $CO_2$ separation system 100 according to this embodiment further includes the dehumidifier 30 configured to dehumidify the permeating gas. The dehumidifier 30 and the depressurization pump serving as the pressure difference generator 40 are arranged in the permeating gas passage 60 (on the gas path of the permeating gas) in the order of the dehumidifier 30 and the depressurization pump from the upstream side in the gas flow direction.

The exhaust gas containing water vapor is introduced into the separation-membrane upstream chamber 22, and the permeating gas that permeates the separation membrane 21 is dehumidified instead of dehumidifying the exhaust gas before $CO_2$ and water vapor are separated by the separation membrane 21. Thus, the separation of $CO_2$ in the $CO_2$ separator 20 can be promoted as described above.

The depressurization pump serving as the pressure difference generator 40 is provided in the permeating gas passage 60 on the downstream side of the dehumidifier 30 in the gas flow direction. Thus, it is possible to suppress a breakdown or deterioration of the depressurization pump due to water vapor (moisture) in the gas.

The dehumidified permeating gas is introduced into the $CO_2$ collector 50. Thus, a decrease in the adsorbability of zeolite can be suppressed.

Second Embodiment

Next, a second embodiment of the present disclosure is described. This embodiment differs from the first embodiment in that the $CO_2$ collector 50 can be heated by using exhaust heat from the dehumidifier 30. The difference is mainly described below.

Figure 4:
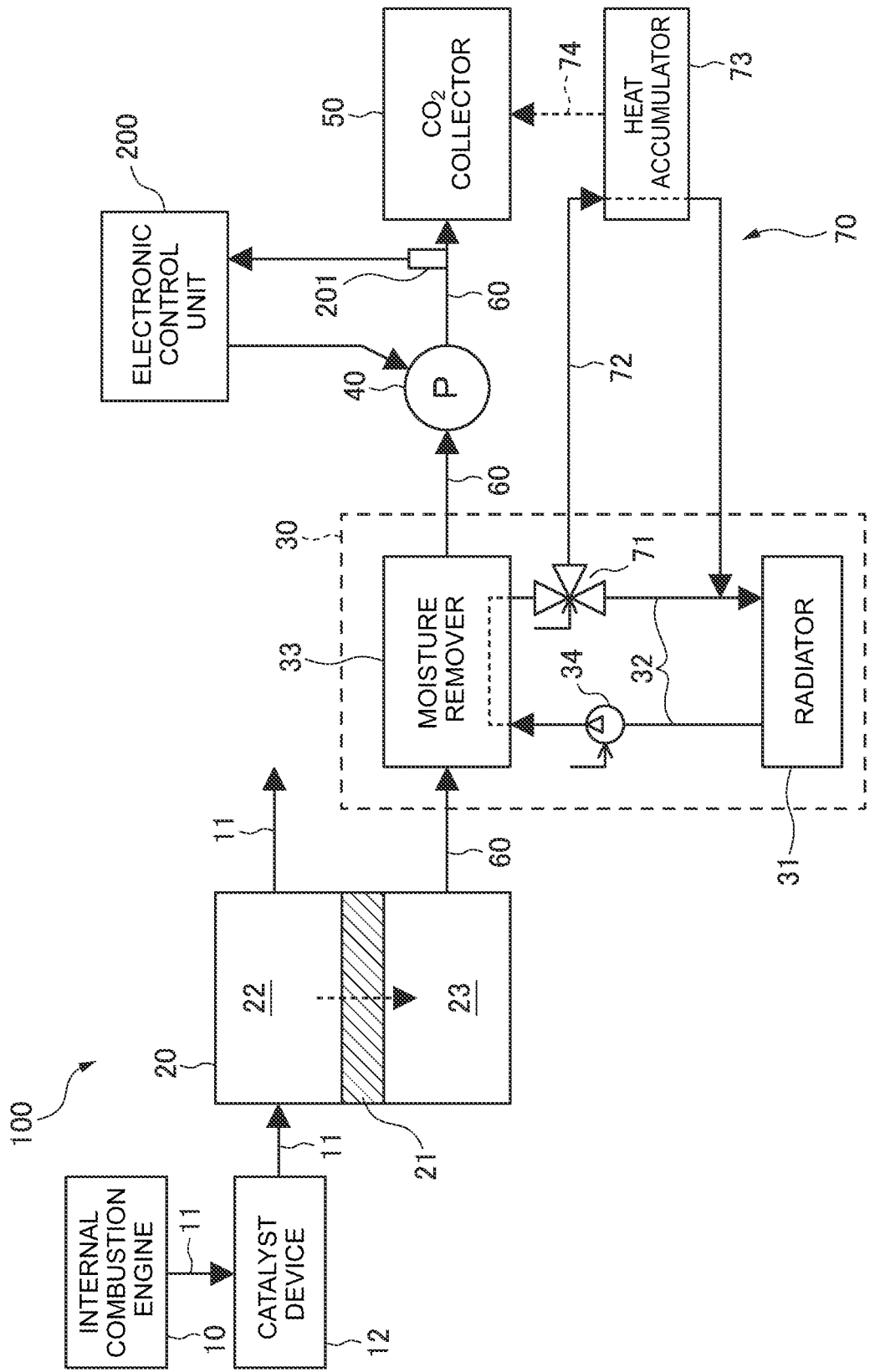
FIG. 4 is a schematic structural diagram of a $CO_2$ separation system according to a second embodiment of the present disclosure.

FIG. 4 is a schematic structural diagram of a $CO_2$ separation system 100 according to this embodiment.

To eject $CO_2$ collected by the $CO_2$ collector 50 to the outside from the $CO_2$ collector 50, it is necessary, as described above, to heat the $CO_2$ collector 50 and furthermore the solid adsorbent to desorb, from the solid adsorbent, the $CO_2$ adsorbed on the solid adsorbent. When the $CO_2$ collector 50 is heated by using, for example, an electric heater, electric energy is newly needed to eject $CO_2$. Thus, energy consumption increases.

The $CO_2$ separation system 100 according to this embodiment includes a heater 70 configured to heat the $CO_2$ collector 50 by using exhaust heat from the dehumidifier 30 to minimize the energy consumption when ejecting $CO_2$.

The heater 70 is configured to heat the $CO_2$ collector 50 by using exhaust heat from the dehumidifier 30. The heater 70 includes a three-way valve 71, a coolant branch passage 72, a heat accumulator 73, and a heat transfer unit 74.

The three-way valve 71 is provided in the coolant circulation passage 32 through which a relatively high-temperature coolant flows after exchanging heat with high-temperature permeating gas at the moisture remover 33. In this embodiment, the three-way valve 71 can be switched to choose whether to directly introduce, into the radiator 31, the relatively high-temperature coolant after exchanging heat with the high-temperature permeating gas at the moisture remover 33 or to introduce the coolant into the radiator 31 via the heat accumulator 73 along the coolant branch passage 72. The three-way valve 71 is switched by the electronic control unit 200.

The heat accumulator 73 is provided in the coolant branch passage 72, and is configured to accumulate heat energy received from the relatively high-temperature coolant flowing through the coolant branch passage 72.

The heat transfer unit 74 is configured to transfer the heat in the heat accumulator 73 to the $CO_2$ collector 50 to heat the $CO_2$ collector 50 when ejecting $CO_2$ from the $CO_2$ collector 50. Examples of the heat transfer unit 74 include a heat pipe.

According to this embodiment, the dehumidifier 30 is configured to dehumidify the permeating gas by cooling the permeating gas through heat exchange with the coolant (heating medium) and condensing moisture in the permeating gas. The $CO_2$ separation system 100 further includes the heater 70 configured to heat the $CO_2$ collector 50 by using heat of the coolant (heating medium) that is received through the heat exchange with the permeating gas. Specifically, the heater 70 includes the heat accumulator 73 configured to accumulate the heat of the coolant (heating medium) that is received through the heat exchange with the permeating gas, and the heat transfer unit 74 configured to transfer the heat in the heat accumulator 73 to the $CO_2$ collector to heat the $CO_2$ collector.

Accordingly, when ejecting $CO_2$ collected by the $CO_2$ collector 50 to the outside from the $CO_2$ collector 50, the $CO_2$ collector 50 can be heated by using the exhaust heat from the dehumidifier 30. Thus, the energy consumption can be reduced when ejecting $CO_2$.

Third Embodiment

Next, a third embodiment of the present disclosure is described. This embodiment differs from the first embodiment in that switching can be made to choose whether to supply exhaust gas to the $CO_2$ separator 20. The difference is mainly described below.

Figure 5:
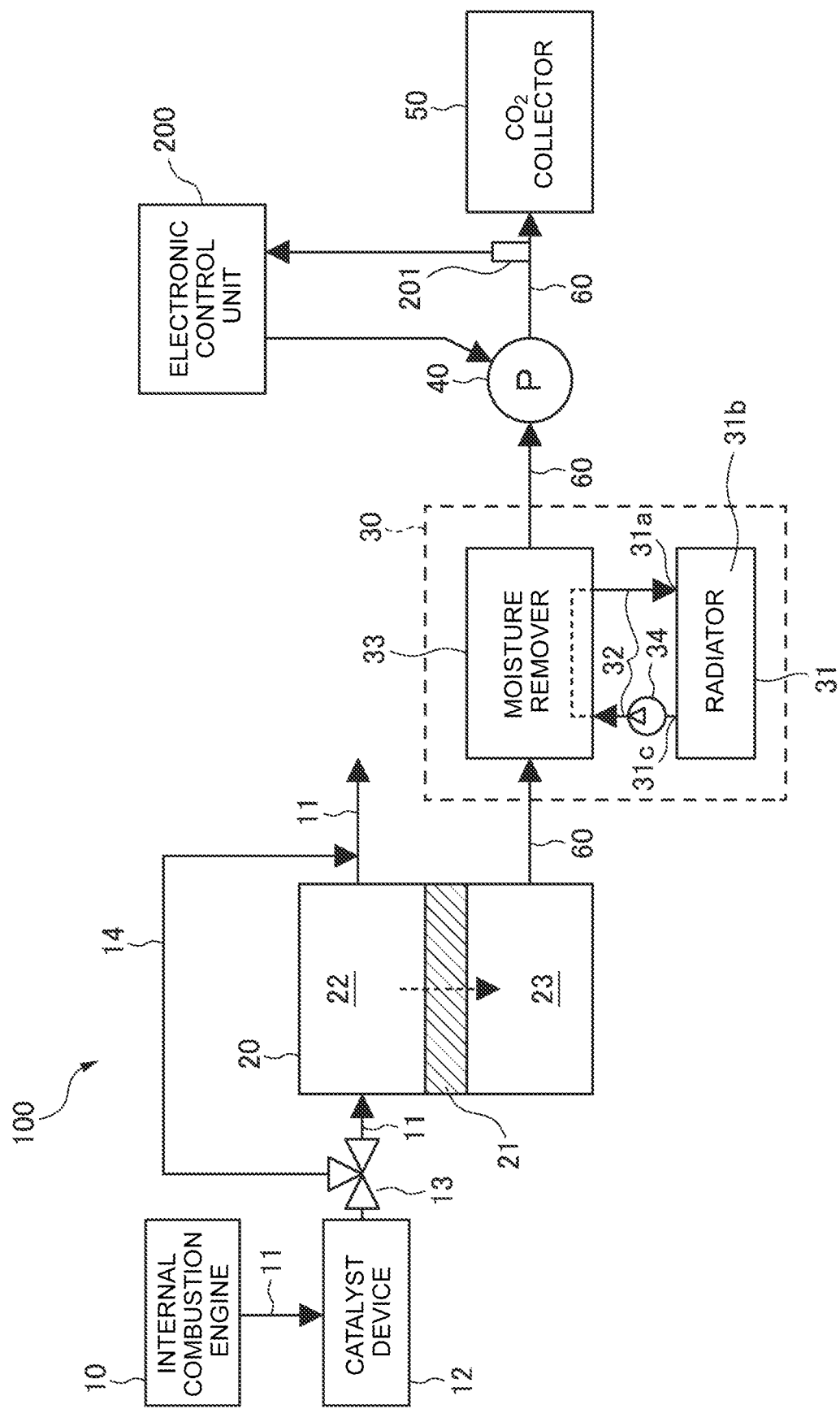
FIG. 5 is a schematic structural diagram of a $CO_2$ separation system according to a third embodiment of the present disclosure.

FIG. 5 is a schematic structural diagram of a $CO_2$ separation system 100 according to this embodiment.

As illustrated in FIG. 5, the $CO_2$ separation system 100 according to this embodiment is configured such that exhaust gas discharged from the catalyst device 12 is discharged to outside air by bypassing the separation-membrane upstream chamber 22 of the $CO_2$ separator 20 as necessary without being supplied to the separation-membrane upstream chamber 22.

Specifically, the $CO_2$ separation system 100 according to this embodiment includes an exhaust gas switching valve 13 and an exhaust gas bypass passage 14. The exhaust gas switching valve 13 is provided on a downstream side of the catalyst device 12 in the exhaust gas flow direction and on an upstream side of the separation-membrane upstream chamber 22 of the $CO_2$ separator 20 in the exhaust gas flow direction. The exhaust gas discharged from the catalyst device 12 is discharged to the outside air by bypassing the separation-membrane upstream chamber 22 through the exhaust gas bypass passage 14.

The exhaust gas switching valve 13 is a three-way valve configured to be switchable to choose whether to cause the exhaust gas discharged from the catalyst device 12 to directly flow into the exhaust passage 11 on a downstream side of the exhaust gas switching valve 13 in the exhaust gas flow direction or to cause the exhaust gas to flow into the exhaust gas bypass passage 14. The switching is controlled by the electronic control unit 200.

For example, when the temperature of the exhaust gas discharged from the catalyst device 12 is higher than a heat resistant temperature of the separation membrane 21, the exhaust gas discharged from the catalyst device 12 can be caused to flow into the exhaust gas bypass passage 14 by the exhaust gas switching valve 13. Thus, deterioration of the separation membrane 21 can be suppressed.

Figure 6:
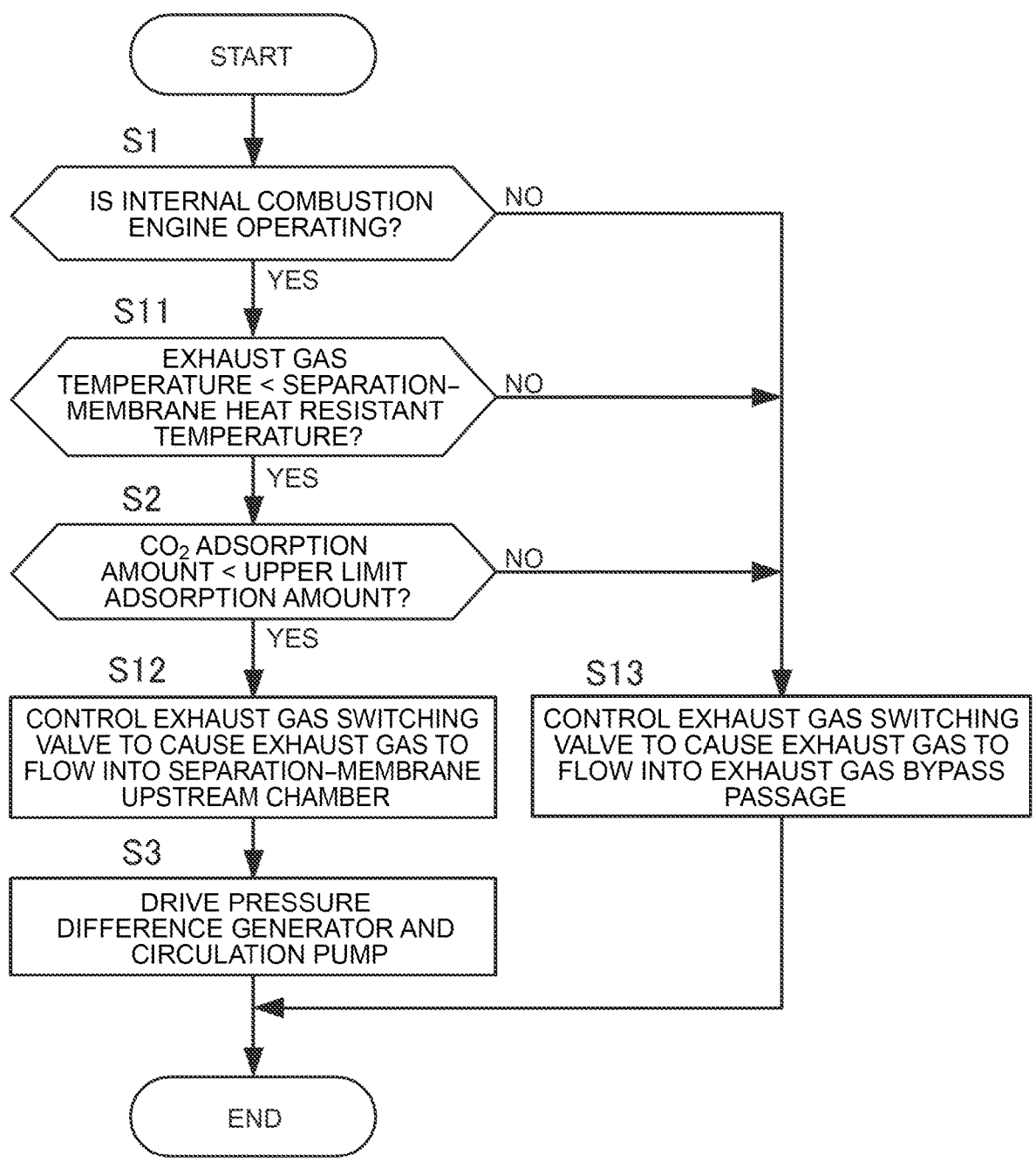
FIG. 6 is a flowchart for describing $CO_2$ separation control according to the third embodiment of the present disclosure.

FIG. 6 is a flowchart for describing $CO_2$ separation control according to this embodiment to be performed by the electronic control unit 200. In FIG. 6, processes similar to those in the first embodiment are performed in Step S1 to Step S3. Therefore, their description is omitted.

In Step S11, the electronic control unit 200 determines whether the temperature of the exhaust gas discharged from the catalyst device 12 is lower than a predetermined separation-membrane heat resistant temperature (for example, 180° C.). When the temperature of the exhaust gas discharged from the catalyst device 12 is lower than the separation-membrane heat resistant temperature, the electronic control unit 200 proceeds to the process of Step S2. When the temperature of the exhaust gas discharged from the catalyst device 12 is equal to or higher than the separation-membrane heat resistant temperature, the electronic control unit 200 proceeds to the process of Step S13.

In Step S12, the electronic control unit 200 controls the exhaust gas switching valve 13 to cause the exhaust gas discharged from the catalyst device 12 to flow into the separation-membrane upstream chamber 22.

In Step S13, the electronic control unit 200 controls the exhaust gas switching valve 13 to cause the exhaust gas discharged from the catalyst device 12 to flow into the exhaust gas bypass passage 14.

In the $CO_2$ separation system 100 according to this embodiment, switching can be made to choose whether to cause the exhaust gas discharged from the catalyst device 12 to flow into the separation-membrane upstream chamber 22 of the $CO_2$ separator 20 or to cause the exhaust gas to flow into the exhaust gas bypass passage 14. Therefore, when the temperature of the exhaust gas is higher than the heat resistant temperature of the separation membrane 21 as described above, the exhaust gas discharged from the catalyst device 12 can be caused to flow into the exhaust gas bypass passage 14 by the exhaust gas switching valve 13. Thus, deterioration of the separation membrane 21 can be suppressed. When the exhaust gas need not flow into the separation-membrane upstream chamber 22, the exhaust gas can be caused to flow into the exhaust gas bypass passage 14 and discharged to the outside air. Thus, it is possible to suppress soiling of the separation membrane 21 due to the exhaust gas.

Although the embodiments of the present disclosure are described above, the embodiments are only illustrative of a part of application examples of the present disclosure, but are not intended to limit the technical scope of the present disclosure to the specific structures of the embodiments.

For example, the depressurization pump is used as the pressure difference generator 40 in the embodiments described above. A pressurization pump may be used together with or in place of the depressurization pump.

Figure 7:
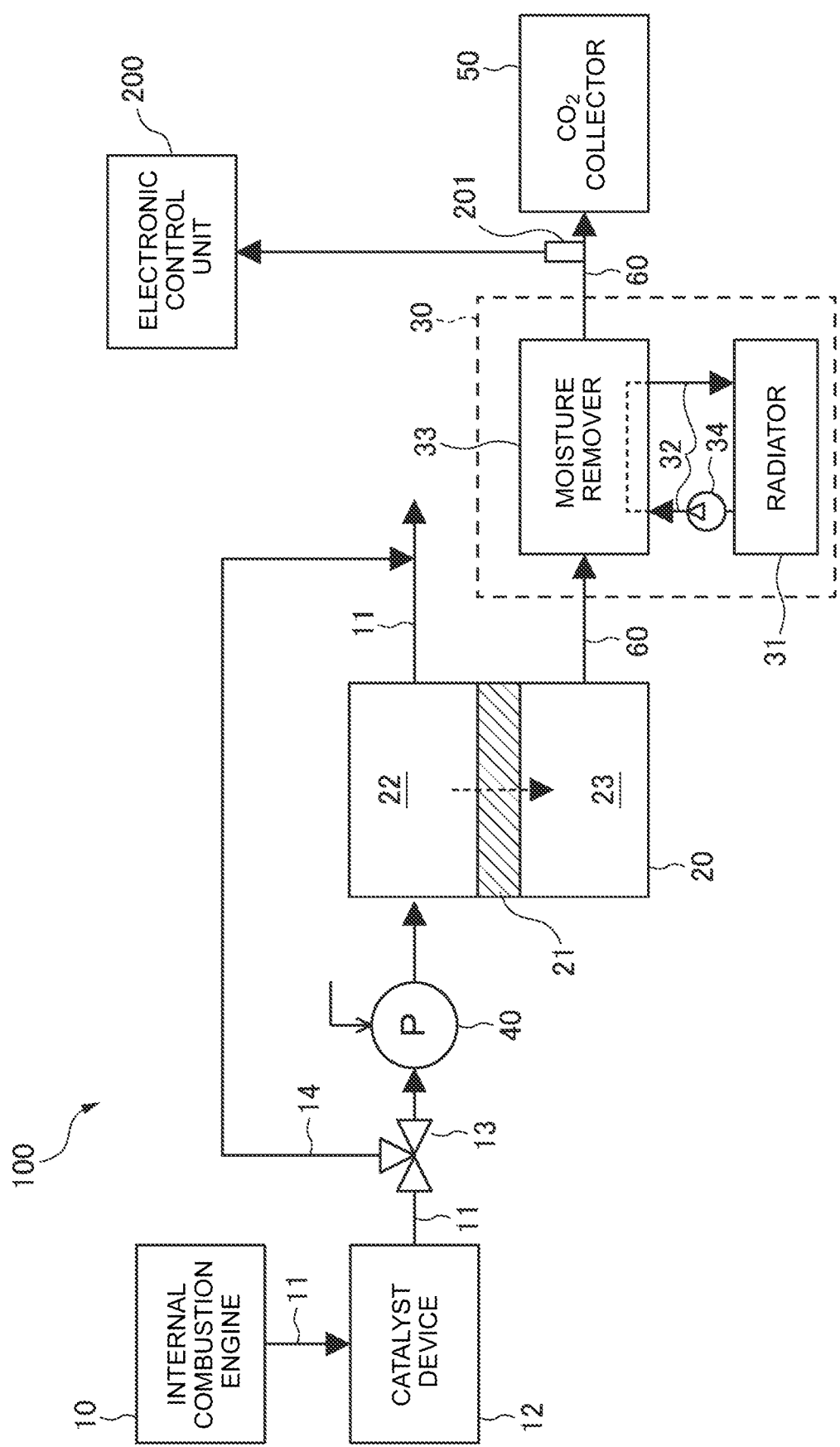
FIG. 7 is a schematic structural diagram of a $CO_2$ separation system using a pressurization pump as a pressure difference generator in place of a depressurization pump.

FIG. 7 is a schematic structural diagram of a $CO_2$ separation system 100 using the pressurization pump as the pressure difference generator 40 in place of the depressurization pump.

Similarly to the third embodiment, the $CO_2$ separation system 100 illustrated in FIG. 7 is configured such that exhaust gas discharged from the catalyst device 12 is discharged to outside air by bypassing the separation-membrane upstream chamber 22 of the $CO_2$ separator 20 as necessary without being supplied to the separation-membrane upstream chamber 22.

In the $CO_2$ separation system 100 illustrated in FIG. 7, the pressurization pump serving as the pressure difference generator 40 is provided in the exhaust passage 11 between the exhaust gas switching valve 13 and the separation-membrane upstream chamber 22 of the $CO_2$ separator 20. By using the pressurization pump as the pressure difference generator 40 and providing the pressurization pump in the exhaust passage 11 on an upstream side of the separation-membrane upstream chamber 22 in the exhaust gas flow direction, the pressure in the separation-membrane upstream chamber 22 is made higher than the atmospheric pressure. In this manner, the pressure difference may be generated between the separation-membrane upstream chamber 22 and the separation-membrane downstream chamber 23 such that the pressure in the separation-membrane upstream chamber 22 is higher than the pressure in the separation-membrane downstream chamber 23.

In the embodiments described above, the exhaust gas discharged from the internal combustion engine 10 is introduced into the separation-membrane upstream chamber 22. In place of the exhaust gas, the atmosphere (air) may be introduced into the separation-membrane upstream chamber 22 and $CO_2$ in the atmosphere may be separated by the $CO_2$ separator 20. In this case, for example, the pressurization pump is used as the pressure difference generator 40 as illustrated in FIG. 7 to force the air into the separation-membrane upstream chamber 22. Thus, the $CO_2$ in the atmosphere can efficiently be introduced into and separated by the $CO_2$ separator 20.

In the embodiments described above, the $CO_2$ collector 50 collects $CO_2$ by so-called physical adsorption, in which $CO_2$ is adsorbed on the solid adsorbent by bringing gas containing $CO_2$ (permeating gas) into contact with the solid adsorbent, and the $CO_2$ is collected by desorbing the $CO_2$ from the solid adsorbent through heating (or depressurization). The method for collecting $CO_2$ is not particularly limited, and $CO_2$ may be collected by various methods such as physical absorption, chemical absorption, and cryogenic separation.

In the physical absorption, gas containing $CO_2$ is brought into contact with an absorbent solution in which $CO_2$ can be dissolved (for example, methanol or ethanol), and the $CO_2$ is physically absorbed into the absorbent solution under high pressure and low temperature. The $CO_2$ is collected from the absorbent solution through heating (or depressurization).

In the chemical absorption, gas containing $CO_2$ is brought into contact with an absorbent solution in which $CO_2$ can be dissolved selectively (for example, amine), and the $CO_2$ is absorbed into the absorbent solution through chemical reaction. The $CO_2$ is collected by dissociating the $CO_2$ from the absorbent solution through heating.

In the cryogenic separation, gas containing $CO_2$ is compressed and cooled to liquefy the $CO_2$. The $CO_2$ is collected by selectively distilling the liquefied $CO_2$.

What is claimed is:

1. A $CO_2$ separation system configured to separate $CO_2$ from mixed gas containing the $CO_2$, the $CO_2$ separation system comprising:
a $CO_2$ separator including
a separation membrane configured to separate the $CO_2$ from the mixed gas, and
a separation-membrane upstream chamber and a separation-membrane downstream chamber demarcated by the separation membrane,
the $CO_2$ separator being disposed to cause the mixed gas to flow into the separation-membrane upstream chamber;
a $CO_2$ collector configured such that permeating gas that contains the $CO_2$ is introduced into the $CO_2$ collector, the $CO_2$ collector being configured to collect the $CO_2$ in the permeating gas, and the permeating gas being gas that has permeated the separation membrane and flowed out of the separation-membrane downstream chamber; and
a pressure difference generator configured to generate a pressure difference between the separation-membrane upstream chamber and the separation-membrane downstream chamber such that a pressure in the separation-membrane upstream chamber is higher than a pressure in the separation-membrane downstream chamber;
a dehumidifier configured to dehumidify the permeating gas; and
a heater, wherein:
the pressure difference generator includes at least a negative pressure generator;
the negative pressure generator is disposed on a gas path of the permeating gas that connects the separation-membrane downstream chamber and the $CO_2$ collector;
the dehumidifier and the negative pressure generator are disposed on the gas path of the permeating gas in order of the dehumidifier and the negative pressure generator from an upstream side in a flow direction of the permeating gas;
the dehumidifier is configured to dehumidify the permeating gas by cooling the permeating gas through heat exchange with a heating medium and condensing moisture in the permeating gas; and
the heater is configured to heat the $CO_2$ collector by using heat of the heating medium that is received through the heat exchange with the permeating gas.

2. The $CO_2$ separation system according to claim 1, further comprising a catalyst device, wherein:
the mixed gas is exhaust gas discharged from an internal combustion engine mounted on a moving object or from a stationary internal combustion engine;
the catalyst device is disposed on an exhaust path of the internal combustion engine, and is configured to remove a toxic substance in the exhaust gas;
the $CO_2$ separator is disposed on the exhaust path on a downstream side of the catalyst device in a flow direction of the exhaust gas;
the $CO_2$ collector is configured such that the permeating gas that contains the $CO_2$ and water vapor is introduced into the $CO_2$ collector, and the permeating gas is gas that has permeated the separation membrane and flowed out of the separation-membrane downstream chamber; and
the dehumidifier and the negative pressure generator are disposed on the gas path of the permeating gas that connects the separation-membrane downstream chamber and the $CO_2$ collector, in order of the dehumidifier and the negative pressure generator from an upstream side in a flow direction of the permeating gas.

3. The $CO_2$ separation system according to claim 2, further comprising an exhaust gas switching valve provided on the exhaust path between the catalyst device and the separation-membrane upstream chamber, and configured to switch whether to introduce the exhaust gas flowing out of the catalyst device into the separation-membrane upstream chamber or to discharge the exhaust gas flowing out of the catalyst device to outside air without introducing the exhaust gas into the separation-membrane upstream chamber.

4. The $CO_2$ separation system according to claim 1, wherein the heater includes:
- a heat accumulator configured to accumulate the heat of the heating medium that is received through the heat exchange with the permeating gas; and
- a heat transfer unit configured to transfer the heat in the heat accumulator to the $CO_2$ collector to heat the $CO_2$ collector.

5. The $CO_2$ separation system according to claim 1, wherein the mixed gas is exhaust gas discharged from an internal combustion engine mounted on a moving object or from a stationary internal combustion engine.

6. The $CO_2$ separation system according to claim 1, wherein the mixed gas is air.

* * * * *